US008250333B2

(12) United States Patent
Gorobets et al.

(10) Patent No.: US 8,250,333 B2
(45) Date of Patent: Aug. 21, 2012

(54) MAPPING ADDRESS TABLE MAINTENANCE IN A MEMORY DEVICE

(75) Inventors: Sergey Anatolievich Gorobets, Edinburgh (GB); Alexander Paley, Kfar-Saba (IL); Eugene Zilberman, Richmond Hill (CA); Alan David Bennett, Edinburgh (GB); Shai Traister, San Jose, CA (US)

(73) Assignee: Sandisk Technologies Inc., Plano, TX (US)

( * ) Notice: Subject to any disclaimer, the term of this patent is extended or adjusted under 35 U.S.C. 154(b) by 670 days.

(21) Appl. No.: 12/348,782

(22) Filed: Jan. 5, 2009

(65) Prior Publication Data
US 2010/0174869 A1  Jul. 8, 2010

(51) Int. Cl.
G06F 12/12 (2006.01)
(52) U.S. Cl. ............... 711/207; 711/135; 711/103
(58) Field of Classification Search .......... None
See application file for complete search history.

(56) References Cited

U.S. PATENT DOCUMENTS

| 5,895,488 | A * | 4/1999 | Loechel ............... 711/135 |
| 6,377,500 | B1 * | 4/2002 | Fujimoto et al. ....... 365/230.01 |
| 2004/0088474 | A1 * | 5/2004 | Lin ..................... 711/103 |
| 2004/0186946 | A1 | 9/2004 | Lee |
| 2005/0172082 | A1 * | 8/2005 | Liu et al. ............... 711/144 |
| 2007/0101095 | A1 | 5/2007 | Gorobets |
| 2007/0300037 | A1 * | 12/2007 | Rogers et al. ........... 711/202 |
| 2008/0162792 | A1 * | 7/2008 | Wu et al. ............... 711/103 |
| 2008/0162793 | A1 * | 7/2008 | Chu et al. .............. 711/103 |
| 2008/0177935 | A1 * | 7/2008 | Lasser et al. ........... 711/103 |
| 2010/0030999 | A1 * | 2/2010 | Hinz .................... 711/206 |

OTHER PUBLICATIONS

International Search Report issued in International Application No. PCT/US2010/020027, mailed Apr. 23, 2010 (6 pages).
Written Opinion issued in International Application No. PCT/US2010/020027, mailed Apr. 23, 2010 (7 pages).

* cited by examiner

*Primary Examiner* — Kaushikkumar Patel
(74) *Attorney, Agent, or Firm* — Brinks Hofer Gilson & Lione

(57) ABSTRACT

A method and system maintains an address table for mapping logical groups to physical addresses in a memory device. The method includes receiving a request to set an entry in the address table and selecting and flushing entries in an address table cache depending on the existence of the entry in the cache and whether the cache meets a flushing threshold criteria. The flushed entries include less than the maximum capacity of the address table cache. The flushing threshold criteria includes whether the address table cache is full or if a page exceeds a threshold of changed entries. The address table and/or the address table cache may be stored in a non-volatile memory and/or a random access memory. Improved performance may result using this method and system due to the reduced number of write operations and time needed to partially flush the address table cache to the address table.

22 Claims, 9 Drawing Sheets

MAPPING ADDRESS TABLE MAINTENANCE IN A MEMORY DEVICE

TECHNICAL FIELD

This application relates generally to memory devices. More specifically, this application relates to maintenance of logical to physical mapping address tables in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system generally operates without knowledge of this mapping.

An address table in the memory system includes the mapping of the logical address space to the physical memory. In particular, the address table includes pages indicating the mapping of logical groups to physical blocks in the memory system. When the host writes data to logical groups that have already been mapped, the address table may be updated with the pertinent mapping information.

Some memory systems contain a cache to the address table to temporarily store changes to the address table when data is written. Writing to an address table cache instead of to the address table may save some time and write operation overhead. Memory systems with an address table cache may periodically synchronize the changed entries in the cache with the address table by updating the entire cache to the address table, regardless of the amount of actual changed entries in the cache. However, in a large memory system that may have over one hundred pages in the address table, updating the entire address table with changed entries in the address table cache may negatively affect performance and delay other operations in the memory system. Pages in the address table may be unnecessarily rewritten if no changes were made. The flash memory cells used to store the address table may also be worn out prematurely when the entire address table is written.

SUMMARY

In order to address the problems noted above, a method and system for maintaining an address table mapping logical groups to physical addresses is disclosed.

According to a first aspect of the invention, a method is disclosed for maintaining an address table for mapping logical groups to physical addresses in a memory device. The method includes receiving a request to set an entry in the address table, where the entry maps a logical group to a physical address. The address table includes a plurality of pages. The method also includes determining whether the entry exists in an address table cache that stores changes to the address table and determining whether the address table cache meets a flushing threshold criteria. If the entry does not exist in the address table cache and the address table cache meets the flushing threshold criteria, a quantity of pages of the address table is selected. The quantity of pages selected is less than the total number of pages in the address table. The pages in the address table include changed and unchanged entries. Changed entries in the selected pages are flushed from the address table cache to the address table. The requested entry is allocated and set in the address table cache.

In some embodiments, the flushing threshold criteria may include the maximum capacity of the address table cache, and determining whether the address table cache meets the criteria includes determining whether the number of entries in the address table cache is at the maximum capacity of the address table cache. In other embodiments, the flushing threshold criteria may include a threshold of changed entries, and determining whether the address table cache meets the criteria includes determining whether a number of changed entries in the pages of the address table exceeds the threshold of changed entries.

Selecting the quantity of pages to flush in the address table may include selecting the pages with the greatest number of changed entries. Alternatively, selecting the quantity of pages to flush in the address table may include selecting the pages that have a number of changed entries above a predetermined threshold of changed entries. The quantity of pages selected to be flushed may be one. Flushing changed entries from the address table cache to the address table may include updating the entries in the address table with the changed entries in the address table cache.

The method may further include updating the existing entry for the logical group in the address table cache if the entry already exists in the address table cache. The method may also include allocating and setting the entry for the logical group in the address table cache if the entry does not exist in the address table cache and the address table cache does not meet the flushing threshold criteria. The address table and/or the address table cache may be stored in one or more of a non-volatile memory or a random access memory.

According to another aspect, a memory device includes an address table for mapping logical groups to physical address in the memory device, an address table cache that stores changes to the address table, and a controller. The controller is configured to receive a request to set an entry in the address table, where the entry maps a logical group to a physical address. The address table includes a plurality of pages. The controller is also configured to determine whether the entry exists in an address table cache and determine whether the address table cache meets a flushing threshold criteria. If the controller determines the entry does not exist in the address table cache and that the address table cache meets the flushing threshold criteria, a quantity of pages of the address table is selected. The quantity of pages selected is less than the total number of pages in the address table. The pages in the address table include changed and unchanged entries. The controller flushes changed entries in the selected pages from the address table cache to the address table. The requested entry is allocated and set in the address table cache by the controller.

In some embodiments, the flushing threshold criteria may include the maximum capacity of the address table cache, and determining whether the address table cache meets the criteria includes the controller being configured to determine whether the number of entries in the address table cache is at the maximum capacity of the address table cache. In other embodiments, the flushing threshold criteria may include a threshold of changed entries, and determining whether the address table cache meets the criteria includes the controller being configured to determine whether a number of changed entries in the pages of the address table exceeds the threshold of changed entries.

Selecting the quantity of pages to flush in the address table may include selecting the pages with the greatest number of changed entries. Alternatively, selecting the quantity of pages to flush in the address table may include selecting the pages that have a number of changed entries above a predetermined threshold of changed entries. The quantity of pages selected to be flushed may be one. Flushing changed entries from the address table cache to the address table may include updating the entries in the address table with the changed entries in the address table cache.

The controller may be further configured to update the existing entry for the logical group in the address table cache if the entry already exists in the address table cache. The controller may also be configured to allocate and set the entry for the logical group in the address table cache if the entry does not exist in the address table cache and the address table cache does not meet the flushing threshold criteria. The address table and/or the address table cache may be stored in one or more of a non-volatile memory or a random access memory.

BRIEF DESCRIPTION OF THE PRESENTLY PREFERRED EMBODIMENTS

Figure 1:
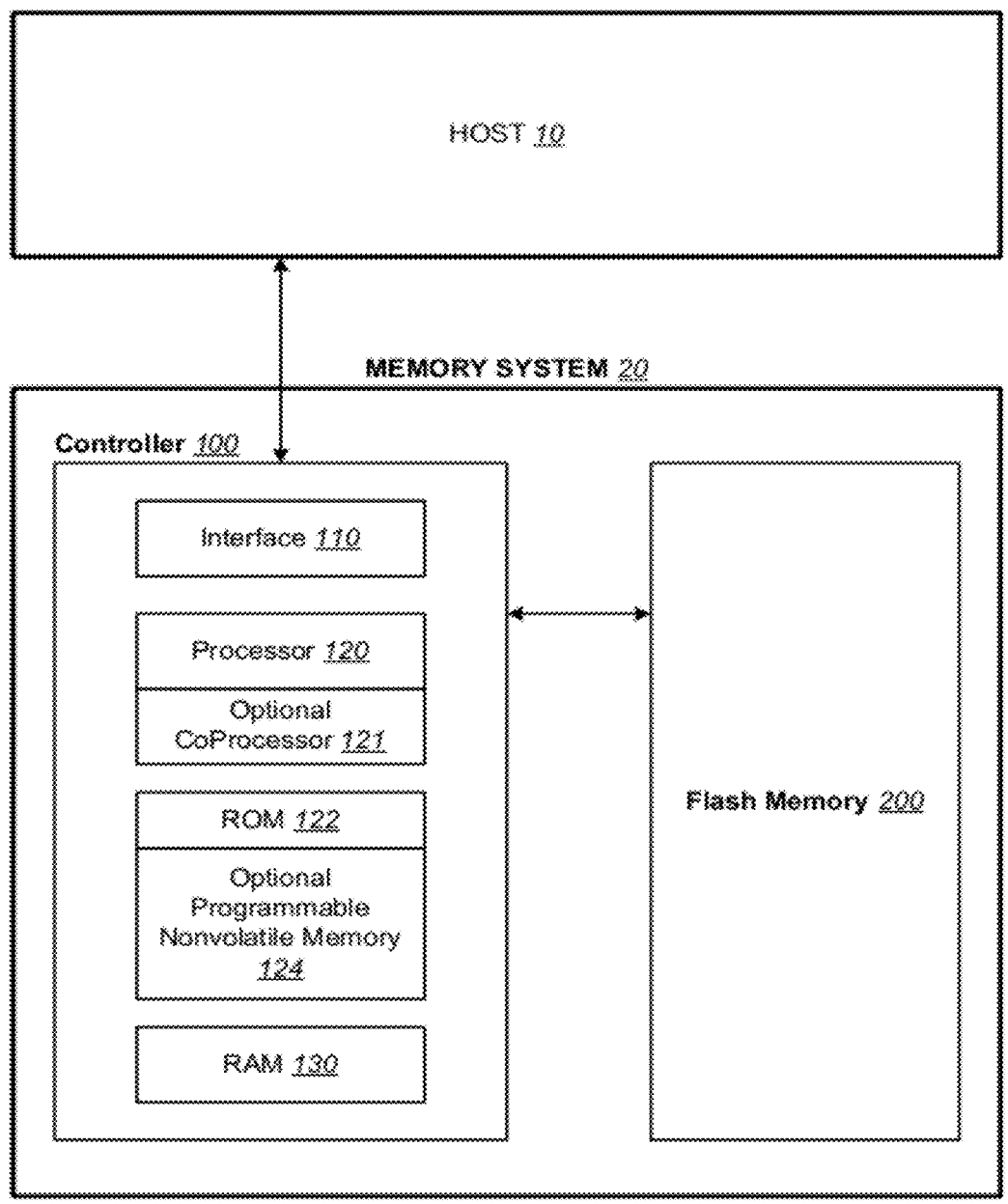
FIG. 1 illustrates the main hardware components of a memory system suitable for implementing embodiments of the invention.

FIG. 1 illustrates the main hardware components of a memory system suitable for implementing embodiments of the invention. The memory system 20 typically operates with a host 10 through a host interface. The memory system is typically in the form of a memory card or an embedded memory system, such as a solid state disk (SSD) drive. The memory system 20 includes a memory 200 whose operations are controlled by a controller 100. The memory 200 comprises one or more array of non-volatile memory cells distributed over one or more integrated circuit chips. The controller 100 includes an interface 110, a processor 120, an optional coprocessor 121, ROM 122 (read only memory), RAM 130 (random access memory) and optionally programmable non-volatile memory 124. The interface 110 has one component interfacing the controller to a host and another component interfacing to the memory 200. Firmware stored in nonvolatile ROM 122 and/or the optional nonvolatile memory 124 provides code for the processor 120 to implement the functions of the controller 100. Error correction codes may be processed by the processor 120 or the optional coprocessor 121. In an alternative embodiment, the controller 100 is implemented by a state machine (not shown). In yet another embodiment, the controller 100 is implemented within the host.

Figure 2:
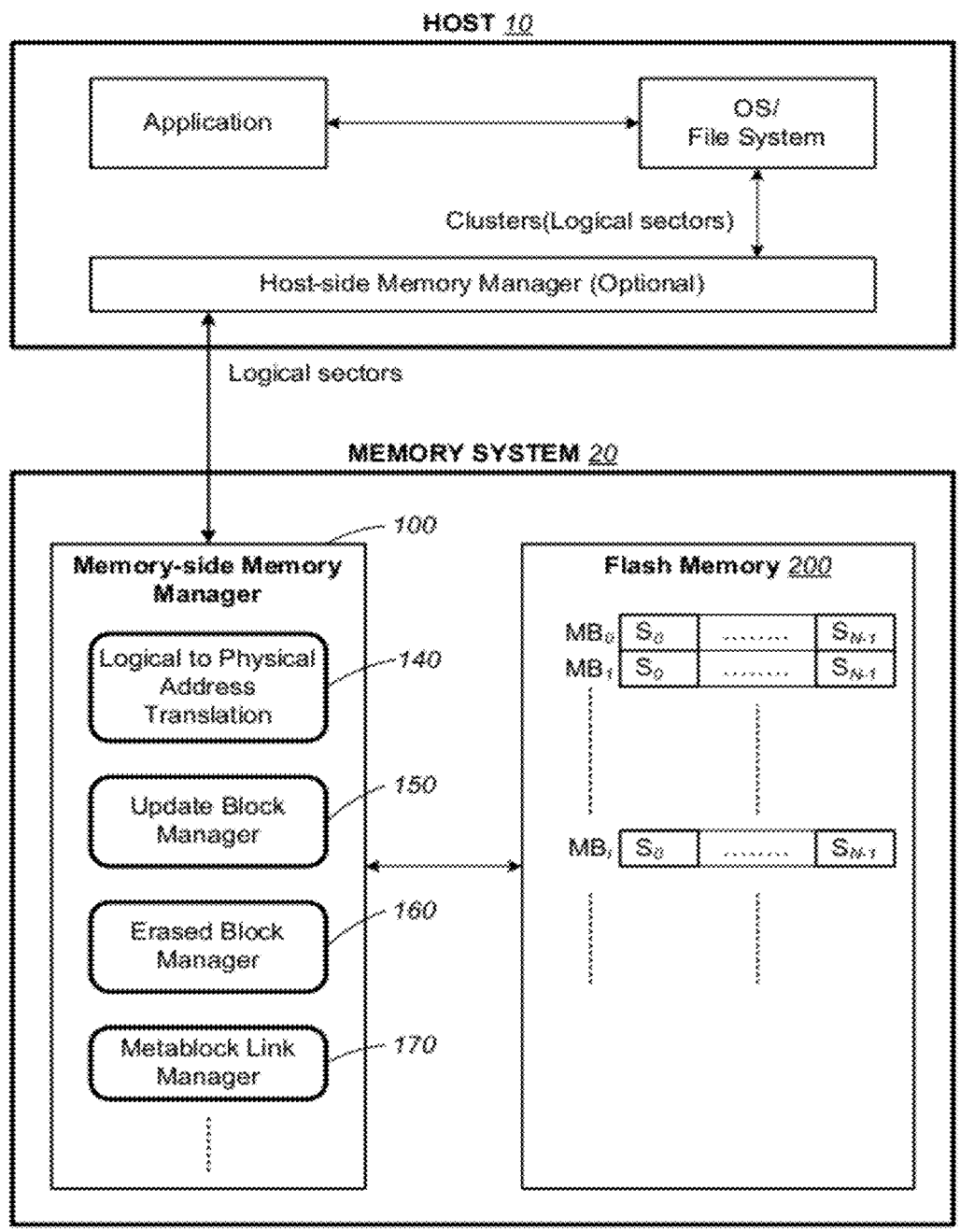
FIG. 2 illustrates the memory being organized into physical groups of sectors (or metablocks) and managed by a memory manager of the controller, according to an embodiment.

FIG. 2 illustrates the memory being organized into physical groups of sectors (or metablocks) and managed by a memory manager of the controller, according to an embodiment. The memory 200 is organized into metablocks $MB_0, \ldots, MB_j$, where each metablock is a group of physical sectors $S_0, \ldots, S_{N-1}$ that are erasable together.

The host 10 accesses the memory 200 when running an application under a file system or operating system. Typically, the host system addresses data in units of logical sectors where, for example, each sector may contain 512 bytes of data. Also, it is usual for the host to read or write to the memory system in units of logical clusters, each consisting of one or more logical sectors. In some host systems, an optional host-side memory manager may exist to perform lower level memory management at the host. In most cases during read or write operations, the host 10 essentially issues a command to the memory system 20 to read or write a segment containing a string of logical sectors of data with contiguous addresses.

A memory-side memory manager is implemented in the controller 100 of the memory system 20 to manage the storage and retrieval of the data of host logical sectors among metablocks of the flash memory 200. In the preferred embodiment, the memory manager contains a number of software modules for managing erase, read and write operations of the metablocks. The memory manager also maintains system control and directory data associated with its operations among the flash memory 200 and the controller RAM 130.

Figure 3A:
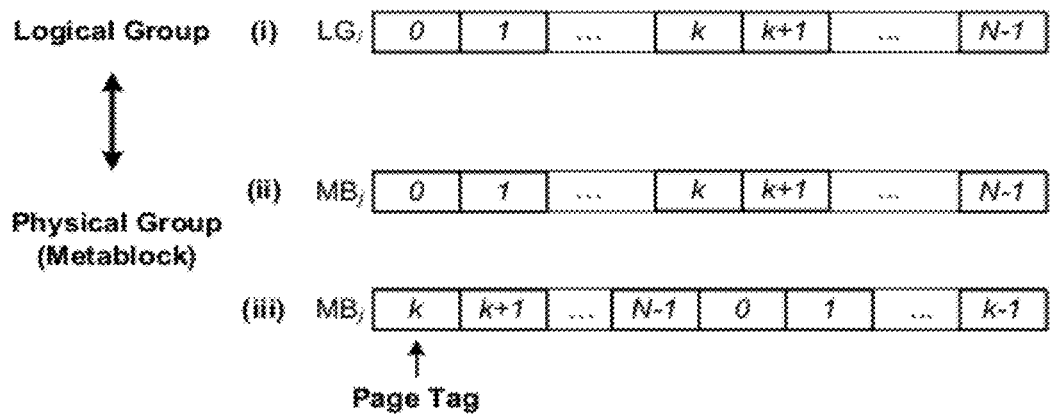
FIG. 3A illustrates the mapping between a logical group and a metablock, according to an embodiment.

FIGS. 3A(i)-3A(iii) illustrate the mapping between a logical group and a metablock, according to an embodiment. The metablock of the physical memory has N physical sectors for storing N logical sectors of data of a logical group. FIG. 3A(i) shows the data from a logical group $LG_i$, where the logical sectors are in contiguous logical order 0, 1, . . . , N−1. FIG. 3A(ii) shows the same data being stored in the metablock in the same logical order. The metablock when stored in this manner is said to be "sequential." In general, the metablock may have data stored in a different order, in which case the metablock is said to be "non-sequential" or "chaotic."

There may be an offset between the lowest address of a logical group and the lowest address of the metablock to which it is mapped. In this case, the logical sector address wraps around as a loop from the bottom back to the top of the logical group within the metablock. For example, in FIG. 3A(iii), the metablock stores in its first location beginning with the data of logical sector k. When the last logical sector N−1 is reached, it wraps around to sector 0 and finally stores data associated with logical sector k−1 in its last physical sector. In the preferred embodiment, a page tag is used to identify any offset, such as identifying the starting logical sector address of the data stored in the first physical sector of the metablock. Two blocks will be considered to have their logical sectors stored in similar order when they only differ by a page tag.

Figure 3B:
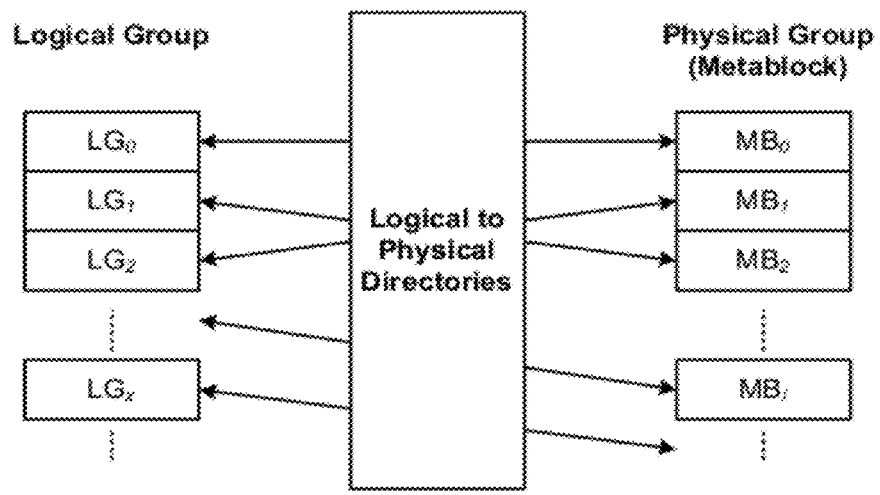
FIG. 3B illustrates the mapping between logical groups and metablocks.

FIG. 3B illustrates the mapping between logical groups and metablocks. Each logical group is mapped to a unique metablock, except for a small number of logical groups in which data is currently being updated. After a logical group has been updated, it may be mapped to a different metablock. The mapping information is maintained in a set of logical to physical directories, such as a group address table and group address table cache, as described below.

Figure 4:
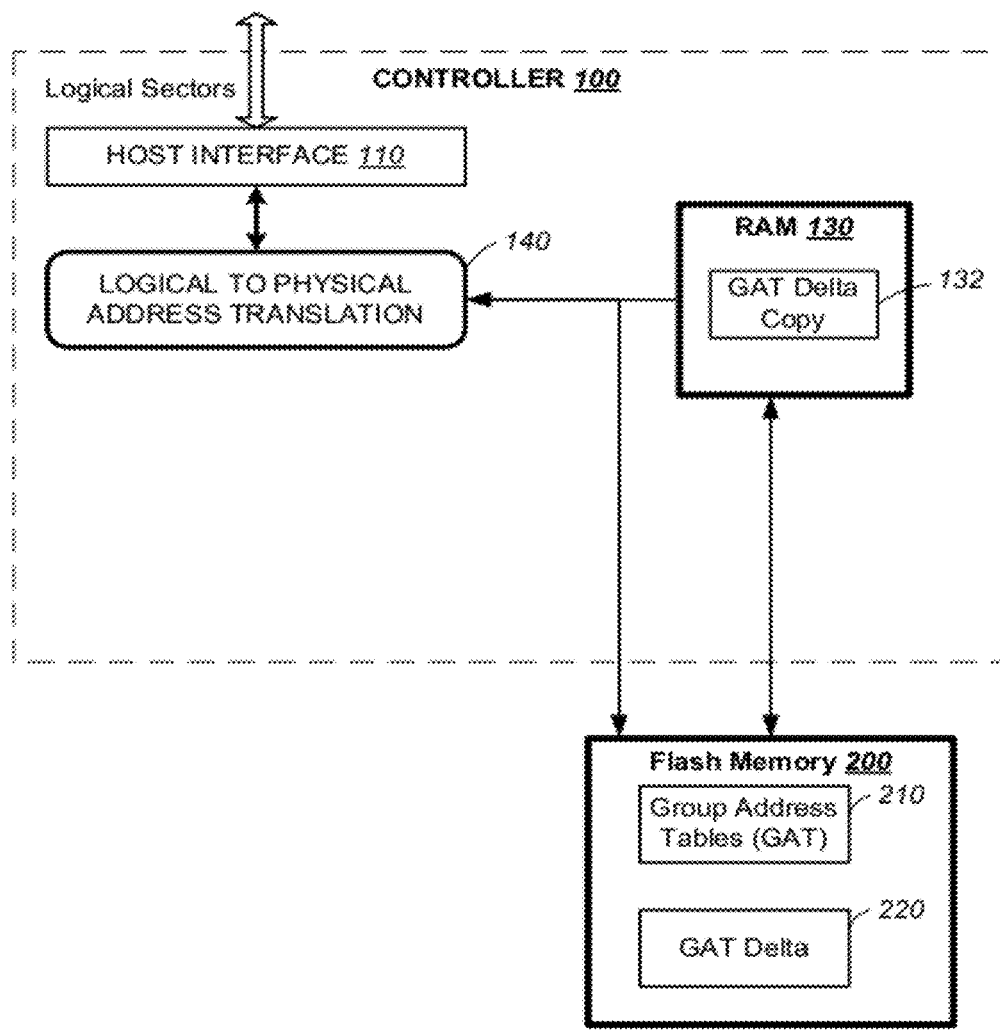
FIG. 4 is a schematic block diagram of the metablock management system as implemented in the controller and flash memory.

FIG. 4 is a block diagram of the metablock management system as implemented in the controller and flash memory. The metablock management system comprises various functional modules implemented in the controller 100 and maintains various control data in tables and lists in the flash memory 200 and the controller RAM 130. The function modules implemented in the controller 100 includes an interface module 110 and a logical-to-physical address translation module 140. The interface 110 allows the metablock management system to interface with a host system. The logical to physical address translation module 140 maps the logical address from the host to a physical memory location.

During operation the metablock management system generates and works with control data such as addresses, control and status information. Since much of the control data tends to be frequently changing data of small size, it cannot be readily stored and maintained efficiently in a flash memory with a large block structure. A hierarchical and distributed scheme may be employed to store the more static control data in the nonvolatile flash memory while locating the smaller amount of the more varying control data in controller RAM for more efficient update and access. In the event of a power shutdown or failure, the scheme allows the control data in the volatile controller RAM to be rebuilt quickly by scanning a small set of control data in the nonvolatile memory.

The non-volatile flash memory 200 may store control data such as the group address table (GAT) 210 and the group address table cache (GAT Delta) 220. The GAT 210 keeps track of the mapping between logical groups of sectors and their corresponding metablocks. The GAT 210 contains one entry for each logical group, ordered sequentially according to logical address. The GAT 210 includes a plurality of pages with each page including entries defining metablock addresses for every logical group in the memory system. The GAT Delta 220 acts as a cache that is a list of changed entries in the mappings of the GAT 210. In one embodiment, the GAT 210 and GAT Delta 220 are both stored in the flash memory 200. Flushing of changed entries from the GAT Delta 220 to the GAT 210 take place within the flash memory 200 in this embodiment.

In some embodiments, the RAM 130 may include a GAT Delta Copy 132. The GAT Delta Copy 132 may contain the same list of changed entries as in the GAT Delta 220. Periodically, the controller may synchronize the GAT Delta Copy 132 and the GAT Delta 220 so that they contain the same information. This process is detailed more below in reference to FIG. 9.

Figure 5:
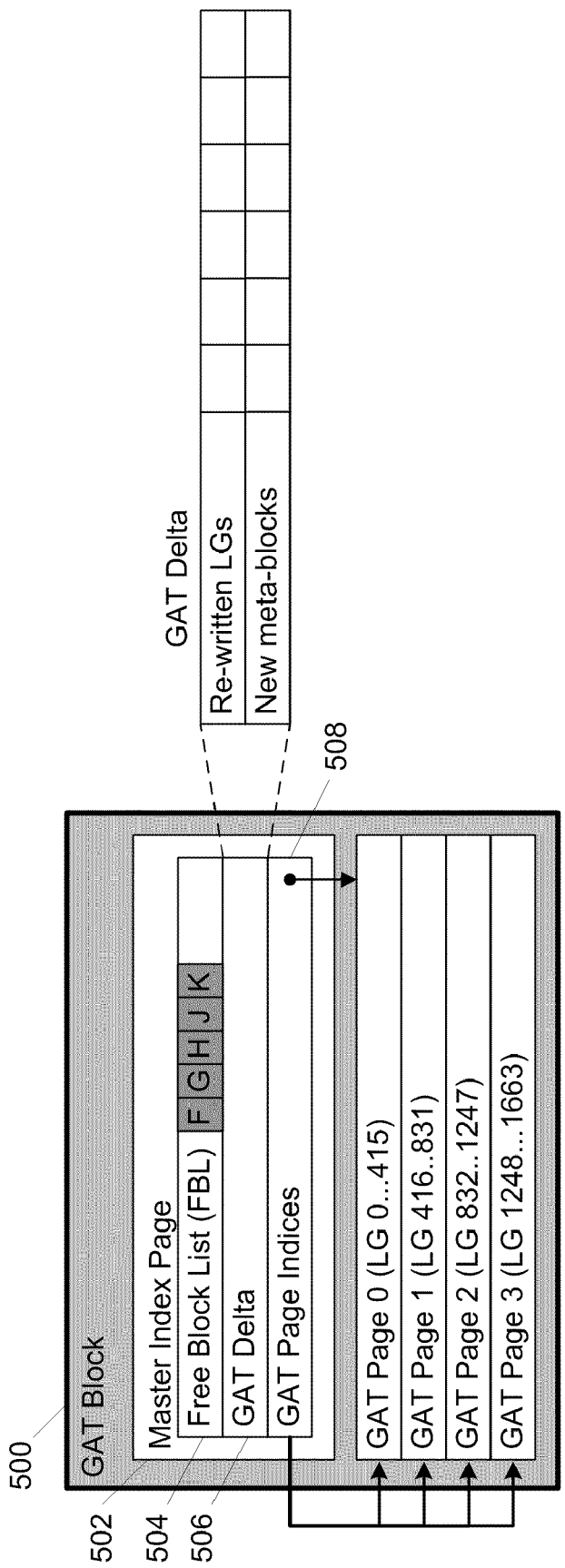
FIG. 5 illustrates the group address table block in an initial state.
Figure 6:
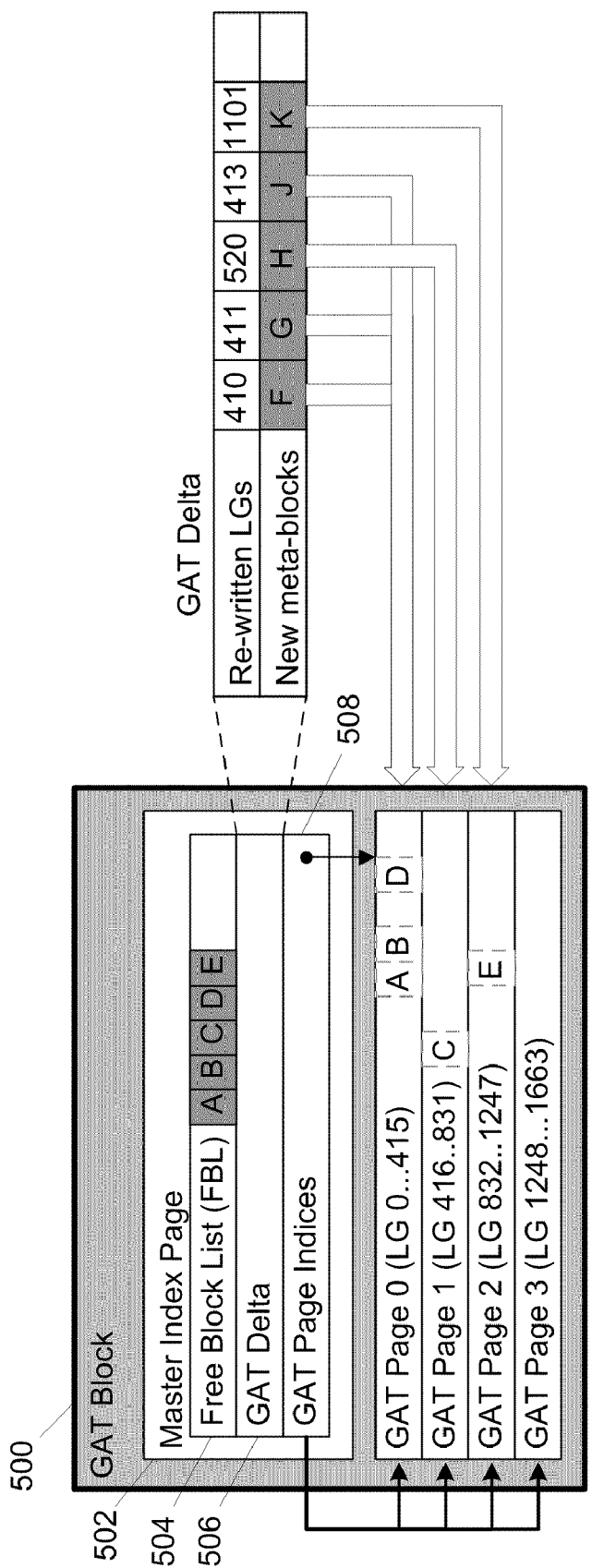
FIG. 6 illustrates the group address table block after data is re-written.
Figure 7:
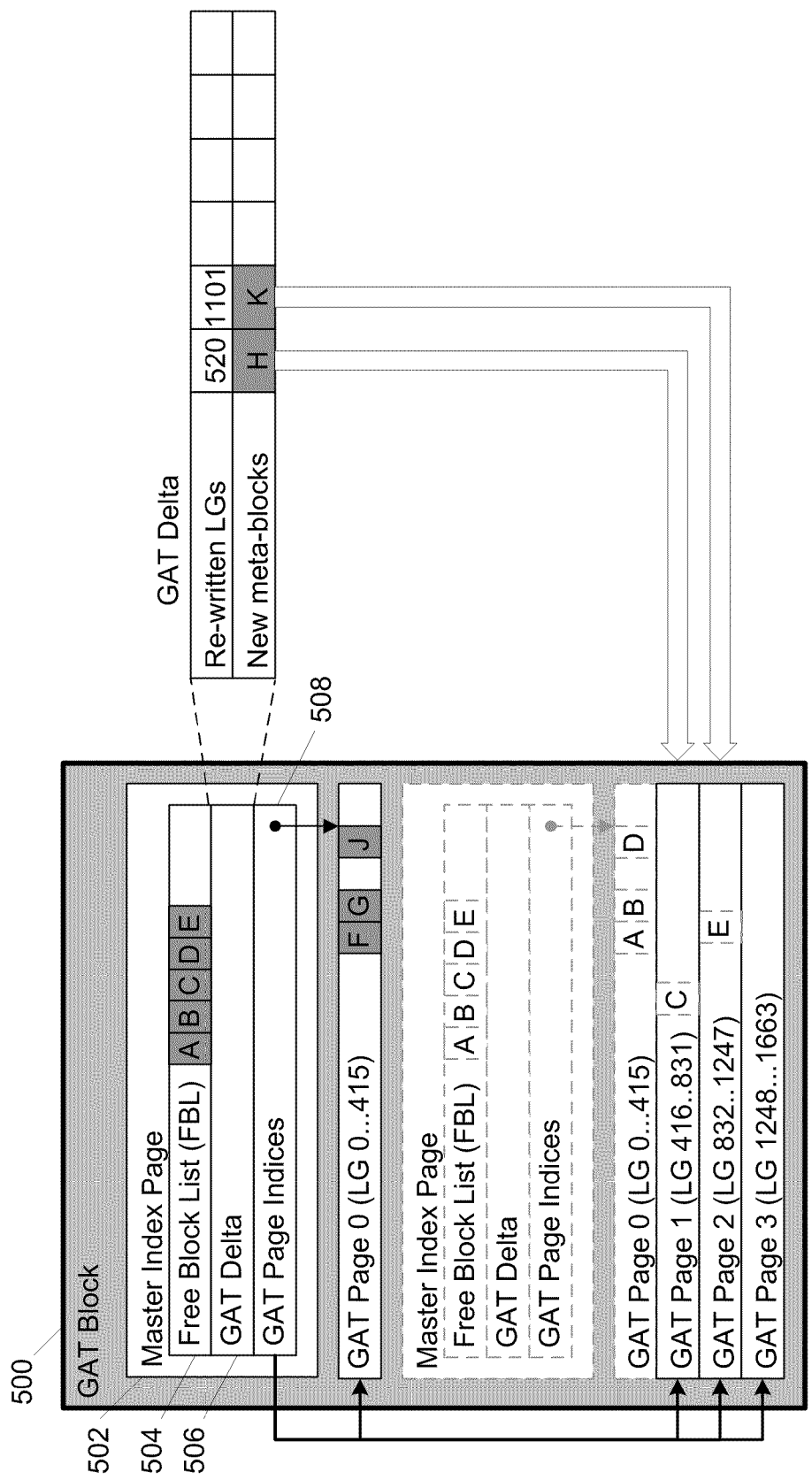
FIG. 7 illustrates the group address table block after a group address table cache update.
Figure 8:
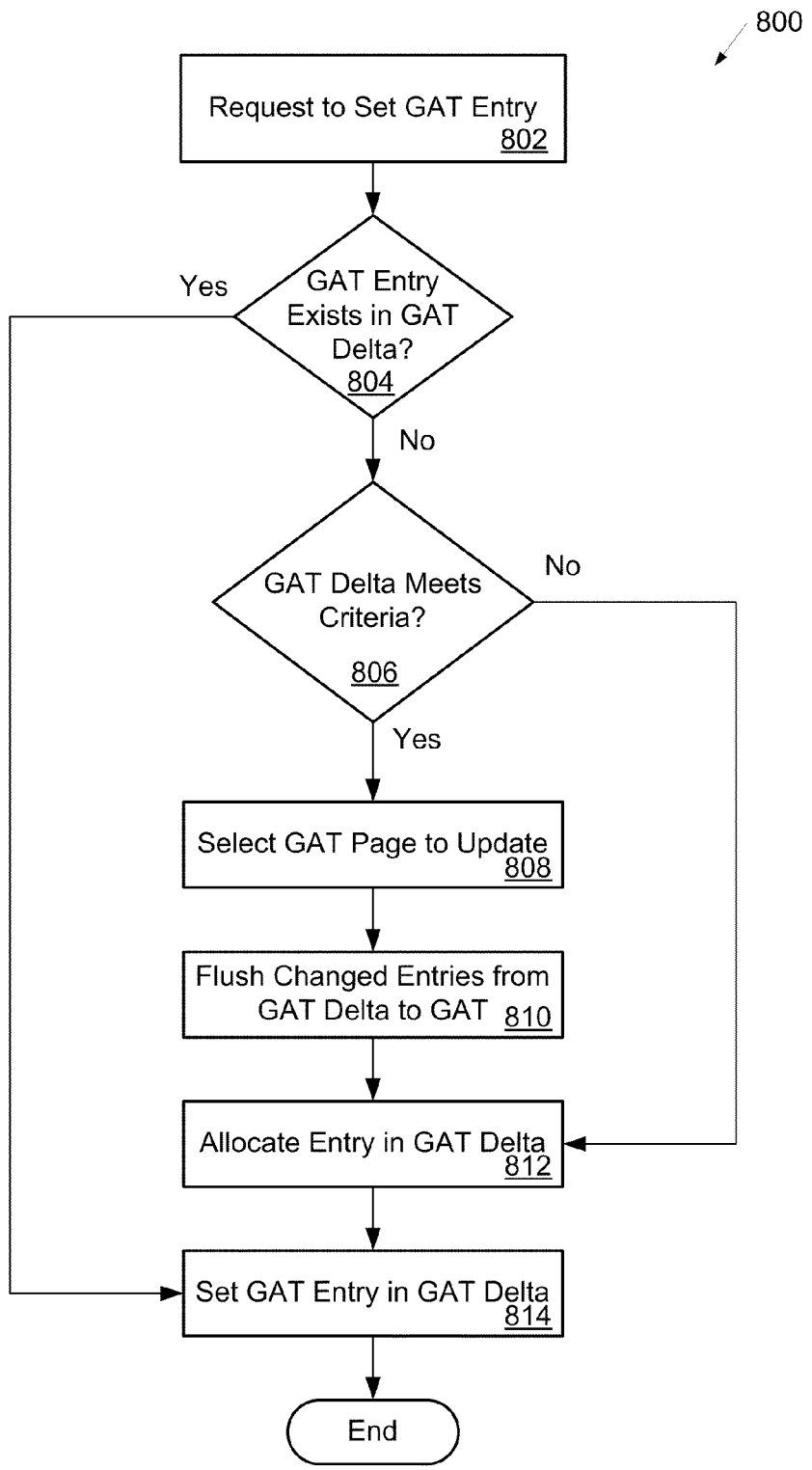
FIG. 8 is a flow diagram illustrating a method of maintaining a group address table and group address table cache that map logical groups to physical addresses.

FIGS. 5-7 illustrate the group address table (GAT) block 500 in (1) an initial state with an empty GAT Delta; (2) after logical groups are re-written with an updated GAT Delta; and (3) after the GAT Delta is partially flushed to the GAT. FIG. 8 is a flow diagram illustrating a method 800 of maintaining a group address table and group address table cache that map logical groups to physical addresses. Each of the steps described in FIG. 8 for the method 800 may be performed alone or in combination with other steps.

FIG. 5 illustrates the group address table (GAT) block 500 in an initial state. The GAT block 500 includes a master index page 502 containing a free block list (FBL) 504, a GAT Delta 506, and a GAT 508 that includes a plurality of pages, where each page includes entries mapping metablock addresses for logical groups that have been written to. The FBL 504 lists available free blocks that may be later mapped to logical groups. The FBL 504 may be in the order the free blocks were previously allocated. In FIG. 5, the exemplary FBL 504 lists metablocks F, G, H, J, and K as free blocks.

In an initial state of the memory system, written logical groups are already assigned to physical metablocks in entries of the pages in the GAT 508. The exemplary GAT 508 in FIG. 5 includes Pages 0, 1, 2, and 3 that each has 416 entries corresponding to logical groups. The GAT Delta 506 is empty in the initial state because no changes have been made to the GAT 508 yet. In other words, in the initial state shown in FIG. 5, the GAT 508 contains the most updated mapping for the logical groups to physical metablocks.

FIG. 6 illustrates the GAT block 500 after data is re-written by the host. The old copy of the master index page 502 shown in FIG. 5 is not shown in FIG. 6. When data is written from the host, a request to set an entry in the GAT 508 mapping a logical group to a physical metablock may be received at step 802 of the method 800 shown in FIG. 8. Because the GAT Delta 506 may contain more recent mapping information than the GAT 508, the GAT Delta 506 is checked to see if the entry specified in the set request already exists at step 804. If the entry already exists at step 804, then it is updated with the new mapping information from the request at step 814. In some embodiments, if the entry already exists in the GAT Delta 506, the corresponding page in the GAT 508 containing the logical group for the already existing entry may be updated immediately from the GAT Delta 506. In other embodiments, if the entry already exists in the GAT Delta 506, a new entry may be allocated and set in the GAT Delta 506 for the logical group specified in the request.

However, if the entry does not already exist in the GAT Delta 506 at step 804, the entry may be allocated and set if a flushing threshold criteria is not met at step 806. In this case, the entry is allocated and set in the GAT Delta 506 based on the request at steps 812 and 814. The flushing threshold criteria includes the GAT Delta 506 reaching its maximum capacity, if one or more pages in the GAT 508 have a number of changed entries above a threshold, or after a certain time period has elapsed. Flushing threshold criteria may also include doing a preemptive flush if the master index page 502 is updated for other reasons.

Another flushing threshold criteria may include a case when the GAT 508 is compacted. In one embodiment, when the GAT 508 is compacted, valid pages in the GAT 508 are copied from the compacted GAT block and the updated indices for the GAT 508 are written to the master index page 502. In another embodiment, when the GAT 508 is compacted, pages in the GAT 508 are copied and updated with changed entries from the GAT Delta 506. In this compaction case, the GAT Delta 506 may be partially or fully flushed after compaction and updating of the GAT 508. At a minimum, in this compaction case, the GAT Delta 506 would no longer include any entries for the pages in the GAT 508 that were compacted.

Therefore, if the entry does not exist in the GAT Delta 506 and the flushing threshold criteria is not met at step 806, the GAT Delta 506 is not flushed and synchronized with the GAT 508. When the host rewrites data to logical groups, the corresponding physical metablock the data is written to is recorded in entries in the GAT Delta 506 at steps 812 and 814 instead of directly in the GAT 508. For example, in FIG. 6, the host rewrites logical groups 410, 411, 520, 413, and 1101. A request to set entries for these logical groups may be received at step 802. Because the GAT Delta 506 is empty at step 804, the entries for these logical groups do not already exist in the GAT Delta 506 of FIG. 5. In addition to the entries' non-existence in the GAT Delta 506, because the flushing threshold criteria for the GAT Delta 506 is not met at step 806, the entries for the logical groups are allocated and set at steps 812 and 814. Following steps 812 and 814, the GAT Delta 506 is no longer empty and includes entries mapping logical groups 410, 411, 520, 413, and 1101 to physical metablocks F, G, H, J, and K, respectively. The memory controller writes the data for these blocks into free blocks F, G, H, J, and K, respectively, based on the available free blocks listed in FBL 504.

The logical groups 410, 411, 520, 413, and 1101 had previously been mapped to physical metablocks A, B, C, D, and E, respectively. At this point, the GAT 508 still contains this original mapping, however, the entries for these logical groups in the GAT 508 are now superseded by the entries in the GAT Delta 506. FIG. 6 shows the superseded physical metablocks A, B, C, D, and E in the GAT 508 as grayed out. Because physical metablocks A, B, C, D, and E no longer contain valid data, the FBL 504 now lists these metablocks as free blocks.

The master index page 502 that includes the FBL 504, GAT Delta 506 and GAT 508 may be updated in a single write operation and/or be contained within a single data structure. The master index page 502 may also include other information that is updated in the single write operation, e.g., update block information (e.g., logical groups that have been updated, block locations, and written length), pointers to active binary cache blocks, indices for pages of the GAT 508, wear leveling counters, and other information. The master index page 502 provides a synchronous snapshot of the tables contained within and does not need to be entirely rewritten after every write to a page of the GAT 508.

All physical block references in the master index page 502 are updated in the single write operation such that there are no lost blocks or double-referenced blocks. All physical blocks are referenced by the GAT 508, the master index page 502, or in control blocks (e.g., pointers to blocks in the GAT 508, binary cache blocks, etc.). When a block is taken from the FBL 504, the block may optionally be referenced in the update block information in the master index page 502. The block taken from the FBL 504 is then referenced by the GAT Delta 506 and the GAT 508. The reference for a block is changed in multiple places when a single write operation is performed on the master index page 502, e.g., in the FBL 504, where a new allocated block disappears and a new free block appears, and in the GAT 508 as a new reference. Therefore, instead of updating the FBL 504 and the FBL 508 at the same time using an atomic write operation with separate writes, a single write operation on the master index page 502 collectively updates the FBL 504, the GAT 508, block information, and the logical-to-physical table.

FIG. 7 illustrates the GAT block 500 after a GAT update, including the old copy of the master index page 502 from FIG. 6. The flushing threshold criteria may trigger a partial update of the GAT 508 with the corresponding changed entries from the GAT Delta 506. For example, as shown in the GAT block 500 of FIG. 7, if (1) a request to set an entry in the GAT 508 mapping a logical group to a physical metablock is received at step 802; (2) the entry does not already exist in the GAT Delta 506 at step 804; and (3) the flushing threshold criteria is met at step 806, then a partial update of the GAT 508 occurs at steps 808 and 810. After the partial update of the GAT 508 occurs at steps 808 and 810, then the requested entry may be allocated and set in the GAT Delta 506 at steps 812 and 814, as described previously.

Not all of the superseded entries in the GAT 508 are updated when a partial update of the GAT 508 occurs. Instead, the partial update of the GAT 508 includes a number of pages of the GAT 508 that are selected at step 808. The pages in the GAT 508 selected for updating at step 808 may be the pages with the greatest number of changed entries, or the pages that have a certain number of changed entries above a threshold. The pages selected may also be based on other criteria. The number of pages selected may be one or any number of pages less than the total number of pages in the GAT 508.

When the flushing threshold criteria is met at step 806 and a partial update is triggered, entries in the GAT Delta 506 for the selected pages of the GAT 508 are flushed to those pages of the GAT 508 at step 810. In FIG. 7, GAT Page 0 has been selected at step 808 because it has the greatest number of changed entries relative to the other pages in the GAT 508, i.e., GAT Page 0 has three changed entries for logical groups 410, 411, and 413, while GAT Page 1 and 2 each have one changed entry each. The entries in the GAT 508 for these logical groups are updated with the entries from the GAT Delta at step 810 such that logical groups 410, 411, and 413 are now mapped to physical metablocks F, G, and, J, respectively, in the GAT 508.

The previous GAT Page 0 mapping logical groups 410, 411, and 413 to physical metablocks A, B, and D, respectively is overwritten (shown grayed out in FIG. 7). After the partial update of the GAT 508 is completed, the GAT Delta 506 in FIG. 7 contains entries for the remaining changed mappings for logical groups 520 and 1101 that had been set previously. The corresponding pages in the GAT 508 for logical groups 520 and 1101 are not updated because only GAT Page 0 was selected for flushing.

By flushing a portion of the GAT Delta to the GAT instead of flushing the entire GAT Delta to the GAT, the number of write operations and the time taken up in the flushing process are reduced. For example, instead of flushing entries from the GAT Delta for all pages of a GAT (which may include one hundred or more pages) in a large memory system, only one page of the GAT will be updated with changed entries from a GAT Delta. The overall performance of the memory system may increase because less time and operations are needed to maintain the GAT address table.

Figure 9:
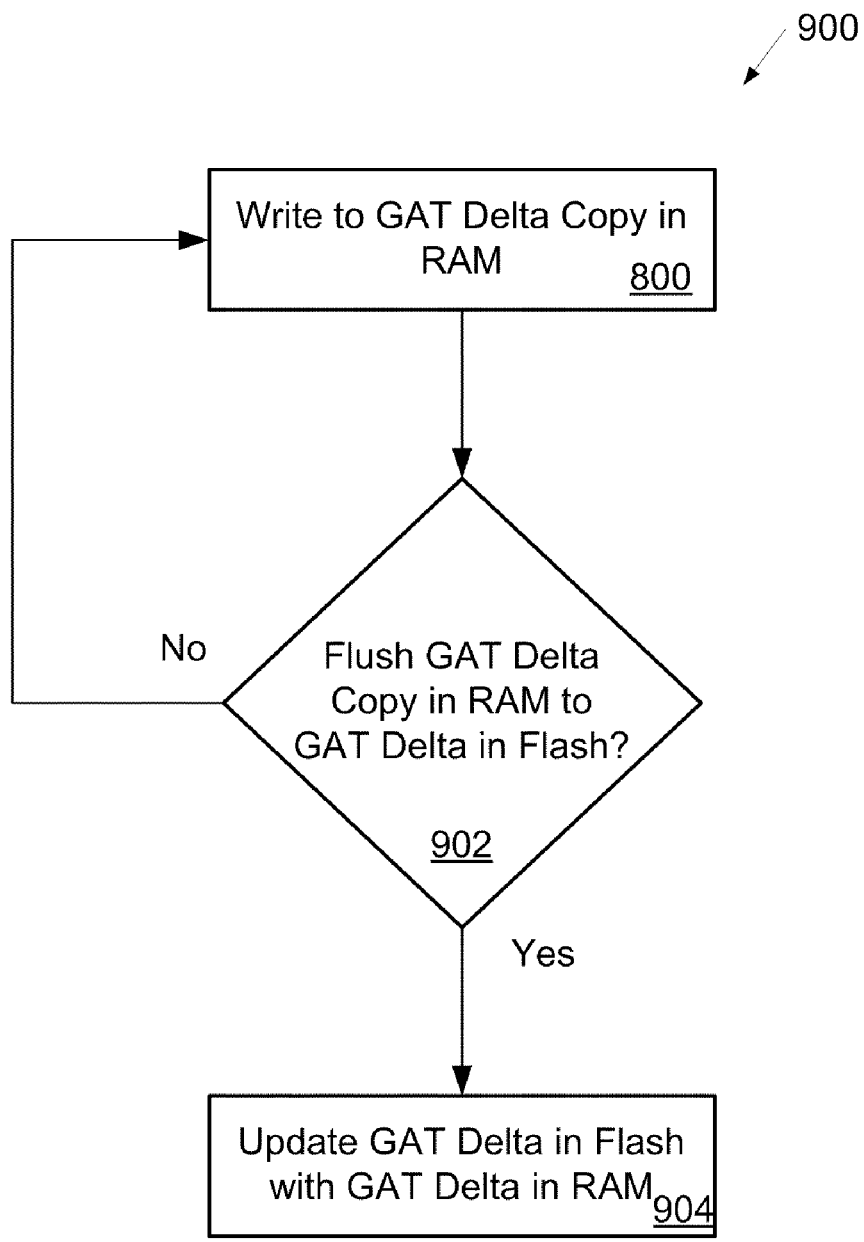
FIG. 9 is a flow diagram illustrating a method of maintaining a group address table cache in random access memory and flash memory.

FIG. 9 is a flow diagram illustrating a method 900 of maintaining a group address table cache in random access memory and flash memory in an embodiment. The method 900 may be implemented using the GAT Delta Copy 132 in the RAM 130 and the GAT Delta 220 in the flash memory 200, for example. Changes to the GAT Delta 220 may first be written to the GAT Delta Copy 132 and periodically synchronized with the GAT Delta 220 in the flash memory 200. Entries in the GAT Delta 220 in the flash memory 200 may then be flushed periodically to the GAT 210, also in the flash memory 200, as described above with reference to FIGS. 5-8 relating to the GAT block 500 and the method 800. Because the RAM 130 has quicker access and modification times relative to the flash memory 200, writing to the GAT Delta Copy 132 in RAM 130 may help to further increase performance of the overall memory system.

In FIG. 9, an entry mapping a logical group to a physical metablock may be set or updated as in the method 800 described above. In other words, a request to set a GAT entry in the method 800 may conclude with (1) updating an existing GAT entry in the GAT Delta Copy 132 using steps 802, 804, and 814; (2) allocating and setting a GAT entry in the GAT Delta Copy 132 using steps 802, 804, 806, 812, and 814; or (3) selecting a GAT page to update, flushing changed entries from the GAT Delta to the GAT, and allocating and setting the new entry in the GAT Delta Copy 132 using steps 802 through 814. However, instead of writing entries to the GAT Delta 220 in flash memory 200, as described above in reference to FIGS. 5-8, entries are written to the GAT Delta Copy 132 in RAM 130.

After a request to set a GAT entry is fulfilled in the method 800, it is determined whether to flush the GAT Delta Copy 132 to the GAT Delta 220 at step 902. The flushing of the GAT Delta Copy 132 to the GAT Delta 220 may occur, for example, when the number of blocks in the free block list (FBL) runs out. When the FBL is empty, it needs to be populated with more free blocks because new blocks can only be allocated from the FBL. If the FBL were left empty, it would not be possible to know which blocks to scan during initialization and to check if the blocks were recently used since the last control update.

In one embodiment, the FBL may be populated with blocks that were previously referenced by the GAT or update block information and have now become obsolete. For example, the mapping entry for a logical group in the GAT Delta may point to a new physical block (which is obtained from the FBL). The mapping entry for the logical group in the GAT may still point to an old physical block that is now a free block. After the entry in the GAT Delta is flushed to the GAT such that the logical group in the GAT points to the new physical block, then the old physical block can be added to the FBL. In other embodiments, the FBL may be populated with free blocks in other tables, such as the spare GAT (SGAT), or from other partitions.

If it is determined at step 902 that flushing is to occur, then the GAT Delta Copy 132 in RAM is synchronized with the GAT Delta 220 in flash memory. However, if it is determined at step 902 that the flushing is not to occur, then the method 900 returns to the method 800 to write further entries to the GAT Delta Copy 132 if subsequent requests to set GAT entries are received.

The entirety of the following concurrently filed (Jan. 5, 2009), commonly owned U.S. provisional patent application is incorporated herein by reference: "Non-Volatile Memory and Method with Improved Block Management System" Ser. No. 61/142,620.

A method and system to maintain an address table for mapping logical groups to physical addresses in a memory device has been disclosed. The method includes receiving a request to set an entry in the address table and selecting and flushing a portion of entries from an address table cache to the address table, depending on the existence of the entry in the cache and whether the cache meets a flushing threshold criteria. The flushing threshold criteria includes whether the address table cache is full or if a page exceeds a threshold of changed entries. The address table and/or the address table cache may be stored in a non-volatile memory and/or a random access memory. Improved performance may result using this method and system due to the reduced overhead of the number of write operations and time needed to only partially flush changed entries in the address table cache to the address table.

It is intended that the foregoing detailed description be regarded as illustrative rather than limiting, and that it be understood that it is the following claims, including all equivalents, that are intended to define the spirit and scope of this invention.

We claim:

1. A method of maintaining an address table in a memory device, the address table for mapping logical groups to physical addresses in the memory device, the method comprising:
    receiving a request to set an entry in the address table, the entry for mapping a logical group to a physical address in the memory device, where the address table comprises a plurality of pages;
    determining whether the entry exists in an address table cache that stores changes to the address table;
    determining whether the address table cache meets a flushing threshold criteria; and
    if the entry does not exist in the address table cache and the address table cache meets the flushing threshold criteria:
        selecting a quantity of pages of the address table less than the total number of pages in the address table, the selected pages comprising changed entries and unchanged entries, wherein the selected pages of the address table each have a number of the changed entries that exceeds a threshold of changed entries;
        flushing changed entries for the selected pages from the address table cache to the address table;
        allocating the entry for the logical group in the address table cache; and
        setting the entry for the logical group in the address table cache based on the request.

2. The method of claim 1, where:
    the flushing threshold criteria comprises a maximum capacity of the address table cache; and
    determining whether the address table cache meets the flushing threshold criteria comprises determining whether a number of entries in the address table cache is at the maximum capacity of the address table cache.

3. The method of claim 1, where:
    the flushing threshold criteria comprises the threshold of changed entries; and
    determining whether the address table cache meets the flushing threshold criteria comprises determining whether a number of changed entries in the selected pages of the address table exceeds the threshold of changed entries.

4. The method of claim 1, where the threshold of changed entries is set so the selected pages are the pages with the greatest number of changed entries.

5. The method of claim 1, where the threshold of changed entries is varied so that the quantity of pages selected is one.

6. The method of claim 1, where flushing comprises updating the entries in the address table for the selected pages with the changed entries in the address table cache.

7. The method of claim 1, further comprising:
    if the entry exists in the address table cache:
        updating the existing entry for the logical group based on the request;
    if the entry does not exist in the address table cache and the address table cache does not meet the flushing threshold criteria:
        allocating the entry for the logical group in the address table cache; and
        setting the entry for the logical group in the address table cache based on the request.

8. The method of claim 1, where one or more of the address table or the address table cache are stored in one or more of a non-volatile memory or a random access memory.

9. A memory device, comprising:
an address table for mapping logical groups to physical address in the memory device;
an address table cache that stores changes to the address table; and a controller configured to:
receive a request to set an entry in the address table, the entry for mapping a logical group to a physical address in the memory device, where the address table comprises a plurality of pages;
determine whether the entry exists in the address table cache;
determine whether the address table cache meets a flushing threshold criteria; and
if the entry does not exist in the address table cache and the address table cache meets the flushing threshold criteria:
select a quantity of pages of the address table less than the total number of pages in the address table, the selected pages comprising changed entries and unchanged entries;
flush changed entries for the selected pages from the address table cache to the address table;
allocate the entry for the logical group in the address table cache; and
set the entry for the logical group in the address table cache based on the request.

10. The memory device of claim 9, where:
the flushing threshold criteria comprises a maximum capacity of the address table cache; and
determining whether the address table cache meets the flushing threshold criteria comprises the controller configured to determine whether a number of entries in the address table cache is at the maximum capacity of the address table cache.

11. The memory device of claim 9, where:
the flushing threshold criteria comprises a threshold of changed entries; and
determining whether the address table cache meets the flushing threshold criteria comprises the controller configured to determine whether a number of changed entries in the selected pages of the address table exceeds the threshold of changed entries.

12. The memory device of claim 9, where selecting the quantity of pages comprises the controller configured to select the pages with the greatest number of changed entries.

13. The memory device of claim 9, where selecting the quantity of pages comprises the controller configured to select the pages that have a number of changed entries above a predetermined threshold of changed entries.

14. The memory device of claim 9, where the quantity of pages selected is one.

15. The memory device of claim 9, where flushing comprises the controller configured to update the entries in the address table for the selected pages with the changed entries in the address table cache.

16. The memory device of claim 9, where the controller is further configured to:
if the entry exists in the address table cache:
update the existing entry for the logical group based on the request;
if the entry does not exist in the address table cache and the address table cache does not meet the flushing threshold criteria:
allocate the entry for the logical group in the address table cache; and
set the entry for the logical group in the address table cache based on the request.

17. The memory device of claim 9, further comprising a non-volatile memory and a random access memory and where one or more of the address table or the address table cache are stored in one or more of the non-volatile memory or the random access memory.

18. A method of maintaining an address table in a memory device, the address table for mapping logical groups to physical addresses in the memory device, the method comprising:
receiving a request to set an entry in the address table, the entry for mapping a logical group to a physical address in the memory device, where the address table comprises a plurality of pages, and setting the entry comprises adding or updating the entry;
determining whether the address table cache meets a flushing threshold criteria, wherein the flushing threshold criteria is based on a number of changed pages from the address table; and
if the address table cache meets the flushing threshold criteria:
selecting a quantity of pages of the address table less than a total number of pages in the address table, the selected pages comprising changed entries and unchanged entries;
flushing changed entries for the selected pages from the address table cache to the address table;
allocating the entry for the logical group in the address table cache; and
setting the entry for the logical group in the address table cache based on the request.

19. The method of claim 18, where:
the flushing threshold criteria comprises a maximum capacity of the address table cache; and
determining whether the address table cache meets the flushing threshold criteria comprises determining whether a number of entries in the address table cache is at the maximum capacity of the address table cache.

20. The method of claim 18, where:
the flushing threshold criteria comprises a threshold of changed entries; and
determining whether the address table cache meets the flushing threshold criteria comprises determining whether a number of changed entries in the selected pages of the address table exceeds the threshold of changed entries.

21. The method of claim 18, where selecting the quantity of pages comprises selecting pages with the greatest number of changed entries.

22. The method of claim 18, where selecting the quantity of pages comprises selecting pages that have a number of changed entries above a predetermined threshold of changed entries.

* * * * *